US008169195B1

(12) United States Patent
Chait et al.

(10) Patent No.: US 8,169,195 B1
(45) Date of Patent: May 1, 2012

(54) METHOD AND APPARATUS FOR USING A BATTERY TERMINAL TEMPERATURE DIFFERENTIAL DURING CHARGING OF THE BATTERY

(75) Inventors: Stanley Chait, New York, NY (US); Paul Nicholas Chait, San Rafael, CA (US)

(73) Assignee: Global Energy Innovations, Santa Clara, CA (US)

( * ) Notice: Subject to any disclaimer, the term of this patent is extended or adjusted under 35 U.S.C. 154(b) by 584 days.

(21) Appl. No.: 12/290,359

(22) Filed: Oct. 29, 2008

Related U.S. Application Data

(63) Continuation-in-part of application No. 11/489,094, filed on Jul. 18, 2006, now Pat. No. 7,786,702.

(51) Int. Cl.
*H02J 7/04* (2006.01)
*H02J 7/16* (2006.01)

(52) U.S. Cl. ........................................ 320/152; 320/150

(58) Field of Classification Search .................. 320/152, 320/150
See application file for complete search history.

(56) References Cited

U.S. PATENT DOCUMENTS

| 4,429,829 | A | * | 2/1984 | Dutton | 236/78 B |
|---|---|---|---|---|---|
| 5,710,507 | A | * | 1/1998 | Rosenbluth et al. | 307/66 |
| 5,767,659 | A | * | 6/1998 | Farley | 320/106 |
| 5,767,661 | A | * | 6/1998 | Williams | 320/152 |
| 2004/0145352 | A1 | * | 7/2004 | Harrison | 320/150 |
| 2005/0253561 | A1 | * | 11/2005 | Tibbs | 320/150 |

* cited by examiner

*Primary Examiner* — M'Baye Diao
(74) *Attorney, Agent, or Firm* — Law Office of Dorian Cartwright

(57) ABSTRACT

A first input receives an indication as to a temperature of a positive terminal from a first temperature probe. A second input receives an indication as to a temperature of a negative terminal from a second temperature probe. A monitor takes an action when a temperature differential that represents a difference in temperature between the positive and negative terminals at a single point in time exceeds a predetermined differential magnitude.

20 Claims, 1 Drawing Sheet

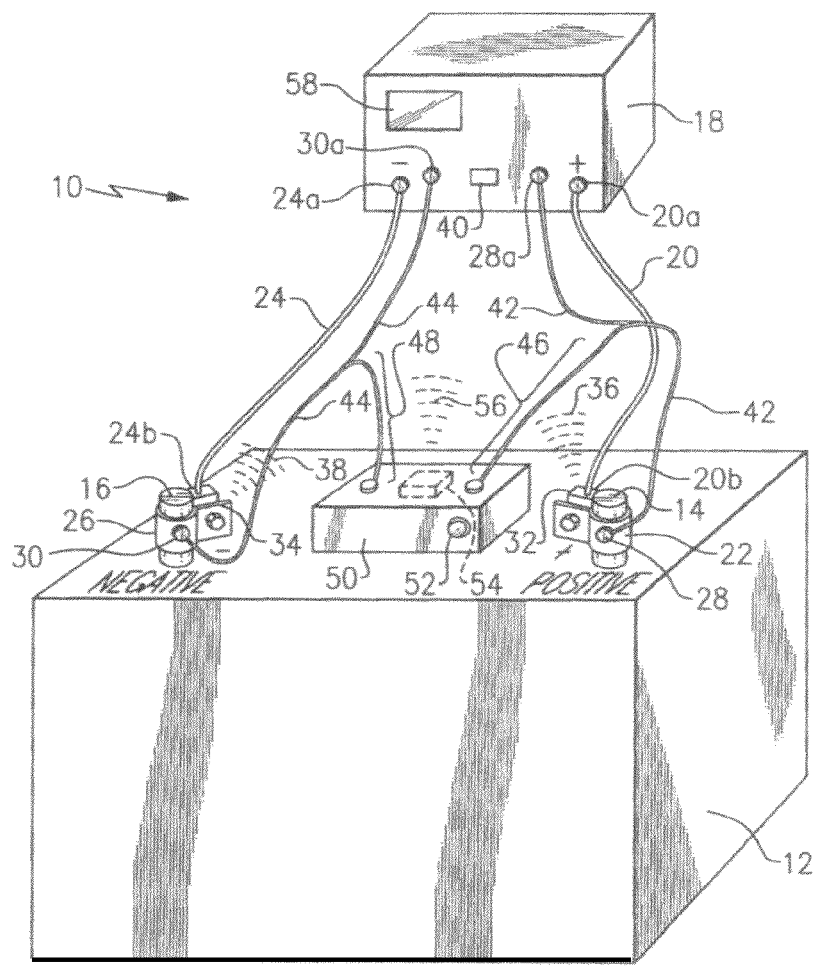

METHOD AND APPARATUS FOR USING A BATTERY TERMINAL TEMPERATURE DIFFERENTIAL DURING CHARGING OF THE BATTERY

This patent application is related to patent application Ser. No. 11/489,094 as a Continuation in Part thereof, and is by the same inventors Paul Chait and Stanley Chait and wherein patent application Ser. No. 11/489,094 was filed on Jul. 18, 2006, and entitled, "Battery Conditioner and Charger" and wherein this application claims the benefit of priority, thereof. The specification, drawings, claims, and content of the above-identified related patent application is incorporated herein by reference.

BACKGROUND OF THE INVENTION

1. Field of the Invention

The present invention, in general, relates to batteries and, more particularly, to charging lead acid batteries.

Battery chargers are well known devices used for automotive, commercial, marine, aviation, and military applications to restore an electrical charge to a dead or weak battery.

Lead acid storage batteries are the most common of these types of batteries and it is a 12-volt lead acid type of battery that is described herein for use with the instant invention. However, the instant invention is applicable for use with any type and voltage of a battery that can benefit from the improvement methods as herein disclosed.

With many applications, such as automotive, a battery is typically held near or at its maximum energy capacity by the charging system of the vehicle. When power is drawn from the battery, for example to start the vehicle, it is soon replenished by the vehicle's charging system. This is an ideal operating environment for a battery and maximum battery life-expectancy is usually realized.

However, there are many situations in which a battery is not used for a protracted period of time, or if used, is not recharged. This is especially hard on lead acid types of batteries.

In some cases the batteries are initially charged to capacity but are then left for weeks or months without being used or serviced. The battery naturally loses its charge (i.e., its reserve and starting capacity) by self-discharge from the local action of impurities of the lead plates and interaction with the electrolyte.

This self-discharge is accelerated at elevated temperatures, and will eventually result in a drop in the terminal voltage of the battery, especially below 1.75 volts per cell (10.5V total for a 12V battery).

Once this threshold is reached, and the battery is left for as little as 24 hours without recharge, it results in lead sulfate particles crystallizing on surfaces of the positive and negative plates. These lead sulfate crystals form a high electrical-resistance that is difficult to remove from the battery plates. This tendency is generally well known and is also discussed in U.S. Navy T.O. 8DZ-62-1. The term "sulfate", as generally used herein, refers to this process or activity, whereas the term "sulfated", as generally used herein, refers to a battery that is affected by and is manifesting this condition.

This crystallized lead sulfate coating substantially increases the internal impedance of the battery. This, in turn, prevents normal battery function from occurring. The battery is no longer capable of delivering sufficient power to a load. Similarly, the high internal impedance affects the ability of the battery to be re-charged.

When a battery charger is connected to a "sulfated" battery, the high internal impedance prohibits re-charging of the battery. The battery charger can remain connected for hours, even days or weeks to no avail. The battery simply will not accept charge current.

In some cases the sulfated battery may gradually begin to accept a charge and be restored but in the vast majority of cases a conventional type of prior art battery charger cannot penetrate the high-impedance sulfated layering that has been deposited on the lead plates of the battery sufficient to dislodge the sulfurous materials or compounds (which are derived from the sulfuric acid) and restore them once again properly back into the electrolyte which includes sulfuric acid. Prior art battery chargers that are used in an attempt to "desulfate", or return the battery to a usable state, are sometimes effective only after very long periods of time after connection. This can often be weeks.

Sulfated batteries that have been in storage or out of use for an extended period of time are generally regarded as useless and most are discarded as hazardous waste while a lesser amount are recycled. This causes tremendous negative environmental impact and enormous financial cost.

There are other causes that contribute to the formation of lead sulfate crystals. Another common cause contributing to the rapid formation of the crystallized lead sulfate coating is by storing a highly discharged battery for even a relatively short period of time, such as 3-4 days, without recharge when an electrical load is also connected to the battery. This is a common problem when lights or other loads are left on batteries for protracted periods of time.

As with self-discharge, high temperatures can further accelerate the sulfating problem. In either case the high resistance crystallized lead sulfate coating eventually results in a "dead" battery with high internal impedance that can not typically be recharged. The sulfated battery may still present some voltage at the battery terminals, but because of the high internal resistance it cannot supply anywhere near a normal current draw, and is therefore considered as dead regardless of whether there is any voltage present at the terminals.

The content of the related patent application that is identified at the beginning of this application is included herein by way of reference, and it provides an improved battery charger and method for restoring or charging batteries that greatly improves efficacy when attempting to restore to usefulness and charge a sulfated battery.

However, there are some batteries that are so severely sulfated or which may also suffer from other defects which, as a result, cannot be restored to usefulness regardless of how much time or effort is expended. These "hopeless" types of batteries cannot be restored or charged to usefulness either by conventional prior art battery chargers or prior art battery charging methods or by the technology and methods as disclosed in the related patent application.

Fortunately, there are relatively few of the hopeless types of batteries. However, there has before been no effective way of determining which of those batteries that are sulfated are hopeless apart from those that are restorable to usefulness other than by investing a great deal of time in vain attempting to restore and charge such a battery and then eventually, deeming the battery as hopeless.

Accordingly, prior determinations that a sulfated battery is hopeless have been done by subjective and arbitrary means, primarily involving the investment of a variable amount of time for restoration and charging of the battery and resulting in the abandonment of the effort and discard of the battery upon the battery failing to be restored and accept a charge in the allocated amount of time. The amount of time is variable because it varies from place to place and person to person. The amount of time for attempting to charge a sulfated battery is determined for the most part by the patience of the person attempting to restore the sulfated battery and in accordance with any governing procedures or suggestions that may exist or be applicable.

It is desirable to be able to make such a determination accurately and as quickly as possible so as to avoid wasted time when attempting to charge a hopeless battery for an extended period of time and also to avoid discarding other batteries that are wrongly deemed as being hopeless when they can, in fact, be restored.

Also, batteries generally build up heat when being charged regardless of the type of charger because, if any current is flowing through the battery, energy (power) is being dissipated in the battery and some of that energy appears as heat. In particular, the use of the technologies as disclosed in the related patent application rely on very high energy pulses to restore lead acid batteries by an internal heating and the breaking up of even high grade (III) sulfation.

With sealed types of batteries, this heat has few ways to escape from the battery, other than by thermodynamic conduction through the battery case and battery terminals. Accordingly, a rise in the temperature at the terminals is experienced and can be detected. Excessive heat can damage the battery if the battery rises in temperature to a typical range of from 45 to 50 degrees Celsius, or more. Additionally, very high battery temperatures can cause an out-gassing of potentially explosive hydrogen gas and pose a risk to those that are nearby.

It is desirable to determine if, during charging, an internal temperature of a battery exceeds a predetermined threshold temperature and if this occurs to either lessen the rate of charge or terminate the attempted charge, as desired.

If the battery being charged has not been determined to be hopeless, it is desirable to lessen the rate of charge rather than terminate the entire charging process if the predetermined threshold temperature is exceeded. For some situations, it may be preferable to lessen the rate of charge to a low value and then increase the rate of charge after the battery has cooled to an acceptable temperature for batteries that are still deemed to have hope of recovery. For other situations with batteries that are still deemed to have hope of recovery it may be preferable to lessen the rate of charge to zero (to temporarily stop charging) and then resume some rate of charging after the battery has cooled to an acceptable temperature.

Either of these responses will extend the overall amount of time that is being used to attempt recovery of the battery. For a hopeless battery it is desirable to cease the restoration and charging attempt as soon as possible. Ideally, for a battery it is desirable to determine if the battery is hopeless and if it is so determined to cease the restoration attempt before a battery experiences a rise in temperature that exceeds the predetermined threshold temperature.

If a battery can be determined to be hopeless at approximately the same time as when the battery experiences a rise in temperature that exceeds the predetermined threshold temperature, it is desirable to terminate the restoration effort and to not resume the effort after the battery has cooled. To resume the restoration effort would only waste time and resources.

Ideally, it is preferable to be able to determine whether or not a battery can be restored to usefulness and if it is determined that the battery is hopeless and cannot be restored to usefulness to terminate the restoration effort as quickly as possible. However, if it has not been determined that the battery is hopeless, it is desirable to resume the restoration effort for a battery that has exceeded a predetermined threshold temperature after the battery has cooled.

It is desirable to provide an indication, either visual or otherwise, for any battery that is determined to be hopeless as accurately and as quickly as possible. This capability could be used by an operator to either continue or cease the restoration effort. It is even more desirable to include as much determination capability and decision making capability as part of the charging equipment so as to better automate the restoration and charging process and to lessen the need for operator presence and operator decision making during restoration and charging, thereby even further lessening labor expenses and the cost of restoration and charging sulfated batteries.

Accordingly, there exists today a need for a method and apparatus for using a battery terminal temperature differential during charging of the battery that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

Clearly, such a method would be useful and the apparatus would be a desirable device.

2. Description of Prior Art

Battery chargers are, in general, known. While the structural arrangements of the above described and known prior art devices may, at first appearance, have certain similarities with the present invention, they differ in material respects. These differences, which will be described in more detail hereinafter, are essential for the effective use of the invention and which admit of the advantages that are not available with the prior art devices.

OBJECTS AND SUMMARY OF THE INVENTION

It is an object of the present invention to provide a method and apparatus for using a battery terminal temperature differential during charging of the battery that provides for an objective method of determining whether or not a battery can be restored to usefulness.

It is also an important object of the invention to provide a method and apparatus for using a battery terminal temperature differential during charging of the battery that provides for an accurate indication as to whether or not a battery can be restored to usefulness.

Another object of the invention is to provide a method and apparatus for using a battery terminal temperature differential during charging of the battery that provides for a timely indication as to whether or not a battery can be restored to usefulness.

Still another object of the invention is to provide a method and apparatus for using a battery terminal temperature differential during charging of the battery that provides an indication as to whether or not a battery can be restored to usefulness in a shorter amount of time than was previously available.

Still yet another object of the invention is to provide a method and apparatus for using a battery terminal temperature differential during charging of the battery that provides a more accurate indication as to whether or not a battery can be restored to usefulness than was previously available.

Yet another important object of the invention is to provide a method and apparatus for using a battery terminal temperature differential during charging of the battery that provides a more accurate indication as to whether or not a battery can be restored to usefulness and in a shorter amount of time than was previously available.

Still yet another important object of the invention is to provide a method and apparatus for using a battery terminal temperature differential during charging of the battery that helps to prevent overheating of the battery from occurring.

A first continuing object of the invention is to provide a method and apparatus for using a battery terminal temperature differential during charging of the battery that can detect a temperature of the battery and either terminate or reduce the a charge current (i.e., amount of energy) being supplied to the battery if the average temperature of the battery rises above a predetermined threshold temperature.

A second continuing object of the invention is to provide a method and apparatus for using a battery terminal temperature differential during charging of the battery that can lessen the cost of restoration and charging a sulfated battery.

A third continuing object of the invention is to provide a method and apparatus for using a battery terminal temperature differential during charging of the battery that can lessen the need for an operator to be present during the process of restoration and charging a sulfated battery.

A fourth continuing object of the invention is to provide a method and apparatus for using a battery terminal temperature differential during charging of the battery that can lessen the need for decision making by an operator during the process of restoration and charging a sulfated battery.

A fifth continuing object of the invention is to provide a method and apparatus for using a battery terminal temperature differential during charging of the battery that provides for an objective method of determining whether or not a sealed type of a battery can be restored to usefulness.

A sixth continuing object of the invention is to provide a method and apparatus for using a battery terminal temperature differential during charging of the battery that detects if a temperature differential between a positive and a negative terminal of a lead-acid type of battery exceeds a predetermined maximum temperature differential amount during an attempted charging or restoration of the battery and when the predetermined maximum temperature differential amount is exceeded, it is used to determine that the battery is no longer usable or capable of being restored.

A seventh continuing object of the invention is to provide a method and apparatus for using a battery terminal temperature differential during charging of the battery that detects if a temperature differential between a positive and a negative terminal of a lead-acid type of battery exceeds a predetermined maximum temperature differential amount during an attempted charging or restoration of the battery by a very high pulse type of charger and when the predetermined maximum temperature differential amount is exceeded, it is used to determine that the battery is no longer usable or capable of being restored.

Briefly, a method and apparatus for using a battery terminal temperature differential during charging of the battery that is constructed and practiced in accordance with the principles of the present invention has a first battery clamp that is attached to a first positive terminal of a lead acid battery and a second battery clamp that is attached to a second negative terminal of the battery. A first temperature probe is inserted in the first clamp and is disposed as close as possible or in contact with a portion of the positive terminal and a second temperature probe is inserted in the second clamp and is disposed as close as possible or in contact with a portion of the negative terminal. The output of the first and second temperature probes are configurable in a variety of ways, including wireless and direct wire connection of the probes to the apparatus, and are used in a determination if the battery still appears as a hopeful candidate that can be restored and charged to usefulness or alternately, if the battery cannot be restored and charged to usefulness and is therefore deemed to be hopeless. This information is used to either continue the restoration and charging process or to terminate the process. If, during the restoration and charging process of a sulfated battery, a differential in temperature between the positive terminal and the negative terminal occurs that exceeds a predetermined maximum temperature differential threshold of approximately 5 degrees Celsius the battery is determined to be hopeless and the restoration process is terminated. Preferably, a high pulse type of a battery charger is used during the restoration and charging process.

BRIEF DESCRIPTION OF THE DRAWING

The FIGURE is a view in perspective of an apparatus for using a battery terminal temperature differential during charging of the battery in any of three general configurations.

DETAILED DESCRIPTION OF THE INVENTION

Referring to the FIGURE is shown, an apparatus for using a battery terminal temperature differential during charging of the battery, identified in general by the reference numeral 10.

A lead acid battery 12 includes a first positive terminal 14 and a second negative terminal 16. A battery conditioner and charger 18 that uses the high energy pulse technology as disclosed in the related patent application supplies the charge current and waveform, as desired, to the battery 12.

The following description of the method and apparatus for using a battery terminal temperature differential 10 is indicative of the results obtained when using the aforementioned high energy pulse technology to attempt to charge or restore a sealed type of the lead acid battery 12. It is to be understood that when using other types of battery chargers (not shown) and other types of lead acid batteries (not shown) including those that are not sealed that the results obtained will vary. For example, a temperature differential, as is described in greater detail hereinafter, as well as the amount of time that is required to exceed the temperature differential and thereby make a determination regarding the prognosis of the battery 12 will vary depending on the type of the battery 12 (i.e., whether it is sealed or not, size, capacity, etc.) and on the type of the battery charger 18 that is being used.

A positive conductor 20 includes a first positive end 20a that originates at a positive output of the battery conditioner and charger 18 and an opposite second positive end 20b that is mechanically and, electrically attached to a first battery clamp 22.

A negative conductor 24 includes a first negative end 24a that originates at a negative output of the battery conditioner and charger 18 and an opposite second negative end 24b that is mechanically and electrically attached to a second battery clamp 26.

During restoration and charging current (conventional current flow) flows out of the battery conditioner and charger 18, into the first positive end 20a, through the positive conductor 20, out the second positive end 20b, through the first battery clamp 22, through the first positive terminal 14, through the battery 12, out through the second negative terminal 16, through the second battery clamp 26, into the second negative end 24b, through the negative conductor 24, out the first negative end 24a, and into the battery conditioner and charger

18, thereby creating a circuit as completed by the circuitry of the battery conditioner and charger 18.

All aspects of current flow including the magnitude of current, voltage, and shape of the waveform that is applied to the battery 12 are controlled by the battery conditioner and charger 18.

It is noted that the first battery clamp 22 preferably includes a commercially available type of battery clamp that securely fastens on to the tapered generally conical shape of the first positive terminal 14. Similarly, the second battery clamp 26 preferably includes a commercially available type of battery clamp that securely fastens on to the tapered generally conical shape of the second negative terminal 16. This type of clamp helps ensure that there is no appreciable amount of heat being generated by a poor electrical connection at either the first positive terminal 14 or at the second negative terminal 16.

A first temperature probe 28 is included in an opening or space that is provided in the first clamp 22 and is disposed as close as possible or in direct contact with a portion of the first positive terminal 14. Similarly, a second temperature probe 30 is included in an opening or space that is provided in the second clamp 26 and is disposed as close as possible or in direct contact with a portion of the second negative terminal 16.

Therefore, the first temperature probe 28 is able to determine the temperature of the first positive terminal 14 and the second temperature probe 30 is able to determine the temperature of the second negative terminal 16.

A preferred type of transducer for the first temperature probe 28 or for the second temperature probe 30 includes a negative temperature coefficient (NTC) thermistor, however other devices including a thermocouple or resistive thermal device (RTD) can, alternately, be used as desired.

According to a first preferred embodiment, a first wireless transmitter 32 is attached to the second clamp 26 and a second wireless transmitter 34 is attached to the first clamp 22. The first wireless transmitter 32 is electrically connected to the first temperature probe 28 and therefore in continuous receipt of data indicating the temperature of the first positive terminal 14. The second wireless transmitter 34 is electrically connected to the second temperature probe 30 and therefore in continuous receipt of data indicating the temperature of the second negative terminal 16.

The first wireless transmitter 32 either continuously or periodically at predetermined intervals broadcasts by radio frequency (RF), infrared (IR), ultrasound or other means a first signal 36 that is representative of the temperature of the first positive terminal 14. The second wireless transmitter 34 either continuously or periodically at predetermined intervals broadcasts by radio frequency (RF), infrared (IR), ultrasound or other means a second signal 38 that is representative of the temperature of the second negative terminal 16.

The first signal 36 is received by a receiver 40 that is located in the battery conditioner and charger 18. The second signal 38 is also received by the receiver 40 or, if desired, a second receiver (not shown) can be used to receive the second signal 38. Various ways of encoding the first signal 36 and the second signal 38 sufficient to permit a determination by the receiver 40 or by receiver circuitry contained within the battery conditioner and charger 18 as to whether the data that is being received by the battery conditioner and charger 18 is indicative of the temperature of the first positive terminal 14 or of the second negative terminal 16, are possible.

Power to operate the first wireless transmitter 32 and the second wireless transmitter 34 can be supplied by the battery conditioner and charger 18 (by the use of additional electrical conductors coming from the battery conditioner and charger 18) or by a separate battery attached thereto, or from the battery 12 while it is being charged.

If desired, a control signal can be supplied to the first wireless transmitter 32 and to the second wireless transmitter 34 (by the use of additional control electrical conductors coming from the battery conditioner and charger 18) that are used to determine when the first wireless transmitter 32 is able to transmit the first signal 36 and when the second wireless transmitter 34 is able to transmit the second signal 38 or, alternately, to control when the first wireless transmitter 32 and the second wireless transmitter 34 are energized and thereby able to transmit the first signal 36 and the second signal 38, respectively.

By controlling the time of transmission for the first wireless transmitter 32 and the time of transmission for the second wireless transmitter 34, the battery conditioner and charger 18 is able to associate any signal that is obtained by the receiver 40 to the proper terminal (i.e., either first positive terminal 14 or the second negative terminal 16). Accordingly, another means for determining the origin of the signal obtained by the receiver 40 is provided.

According to a second preferred embodiment, the first temperature probe 28 includes a first probe lead 42 that extends from the first temperature probe 28 to a first probe input 28a of the battery conditioner and charger 18, thereby permitting receipt of data indicative of the temperature of the first positive terminal 14 by the battery conditioner and charger 18. With the second embodiment, the second temperature probe 30 includes a second probe lead 44 that extends from the second temperature probe 30 to a second probe input 30a of the battery conditioner and charger 18, thereby permitting receipt of data indicative of the temperature of the second negative terminal 16 by the battery conditioner and charger 18.

According to a third preferred embodiment, the first temperature probe 28 includes a modified first probe lead, the modified portion being shown by a first bracket 46 and wherein the second temperature probe 30 includes a modified second probe lead, the modified portion being shown by a second bracket 48. A separate unit 50 is included according to the third embodiment. The modified first and second probe leads connect the output of the first temperature probe 28 and the second temperature probe 30 to the separate unit 50 that is preferably disposed proximate the battery 12.

If desired the separate unit 50 can include an indicator 52. The indicator 52 can include a device that can be illuminated on demand or a device that can produce an audible sound on demand or it can include a separate unit display (not shown), as desired. The separate unit 50 can, if preferred, include an internal wireless transmitter 54 (dashed lines) that is used to transmit by radio frequency (RF), infrared (IR), ultrasound or other means a modified signal 56 that is indicative of the temperature of the first positive terminal 14 or of the second negative terminal 16, or both, as desired that are obtained by the receiver 40.

If desired, the separate unit 50 can be modified to activate the indicator 52 as a warning that either too high a temperature has been reached by the battery 12 or a condition which indicates that the battery 12 cannot be restored and charged to usefulness has occurred. This condition is described in greater detail below. If desired, the separate unit 50 can be additionally modified to transmit a fault condition by way of the modified signal 56 to the battery conditioner and charger 18 when either too high a temperature has been reached by the battery 12 or a condition that indicates that the battery 12 cannot be restored and charged to usefulness has occurred. The battery conditioner and charger 18 would, upon receipt of the fault condition, cease to restore and charge the battery 12 until the battery cooled (for when the battery 12 is still hopeful). If the fault condition indicated that the battery 12 was hopeless, then the battery conditioner and charger 18 would terminate the restoration and charging process for the battery 12.

Preferably, the battery conditioner and charger 18 will include a display 58 that indicates which phase of the restoration and charge cycle is active and all relevant parameters as well as the condition of the battery 12 and if the battery has been determined to be hopeless.

When attempting to restore or charge the battery 12 the battery conditioner and charger 18 (or the separate unit 50 if desired) monitors the temperature of the first positive terminal 14 and of the second negative terminal 16. The differential between the two terminals and the overall or average temperature of the battery 12 are both important.

As long as the temperature differential between the first positive terminal 14 and the second negative terminal 16 is less than that of a predetermined maximum temperature differential (threshold), the battery 12 is deemed to still be a candidate for restoration, unless other serious fault conditions are detected.

If, for example, there was no current flow through the battery 12 because of a fatal flaw in the battery 12, such as an open connection in the battery 12, there would be no temperature rise and no temperature differential. After a predetermined period of no current flow the battery 12 would also be determined to be hopeless but not because of excessive sulfation but because of the open condition.

When using the battery conditioner and charger 18 that employs pulse technology with a particular sealed type of the battery 12 a possible value for the predetermined maximum temperature differential is about 5 degrees Celsius. As discussed in greater detail hereinafter, the magnitude of the predetermined maximum temperature differential can vary and is not limited to 5 degrees Celsius. The predetermined maximum temperature differential can be more or less than 5 degrees Celsius, as desired. For example, a predetermined maximum temperature differential of about 5 degrees Celsius has been shown to be useful with a sealed type of the battery 12 that is generally referred to by the name, "OPTIMA". However, a much larger type of the battery 12 that is generally referred to by the name, "ARMASAFE" has been shown to include a useful predetermined maximum temperature differential within a range of about 8-11 degrees Celsius.

If, however, the temperature differential between the first positive terminal 14 and the second negative terminal 16 remained less than the predetermined maximum temperature differential threshold of 5 degrees Celsius (or whatever is determined to be the predetermined maximum temperature differential threshold for the particular type of the battery 12 and for the particular type of the battery conditioner and charger 18 that are being used) but the average temperature of the battery 12 rose above a predetermined threshold temperature (typically between 45-50 degrees Celsius), then the control circuitry and programming of the battery conditioner and charger 18 would either reduce the current, voltage, duty cycle, or energy supplied to the battery 12 to permit it to cool or temporarily cease charging the battery 12 until it cooled to a predetermined safe temperature, at which time, the attempted restoration and charging effort would resume.

In other words, as long as the temperature differential between the first positive terminal 14 and the second negative terminal 16 remains less than the predetermined maximum temperature differential threshold of approximately 5 degrees Celsius (for this example), and providing that no other significant fault condition of the battery 12 is detected, the battery 12 will remain as a hopeful candidate for continued restoration and charging.

If, however, during restoration or charging the temperature of the battery 12 the temperature differential between the first positive terminal 14 and the second negative terminal 16 exceeds the predetermined maximum temperature differential of approximately 5 degrees Celsius (for this example), the battery 12 is determined to be unusable and therefore, hopeless. The battery conditioner and charger 18 would then terminate the restoration and charging process and indicate that the battery 12 was hopeless and that the process was terminated on the display 58.

If the battery 12 is excessively sulfated and beyond restoration a greater than 5 degree Celsius temperature differential between the first positive terminal 14 and the second negative terminal 16 will usually occur within the first two hours of the restoration process. Often, the predetermined maximum temperature differential of 5 degrees Celsius will be exceeded within 20-40 minutes. For other types of the battery 12 and for values other than 5 degrees Celsius for the predetermined maximum temperature differential, these times may vary.

Accordingly, monitoring of the terminal differential and detecting when the predetermined maximum temperature differential is exceeded or when it becomes greater than 5 degree Celsius in magnitude (for this example) provides an especially accurate indication when the battery 12 cannot be restored and it does it in much less time than was previously required.

The maximum predetermined temperature differential is a variable that can be affected by the type of the battery 12 (whether sealed, size, capacity, etc.) and by the type of the battery conditioner and charger 18 that is being used. If, for example, a prior art type of charger (not shown) is used that does not rely on high energy pulse technology the maximum predetermined temperature differential may include a different or possibly lower value or in some instances it may not be of sufficient magnitude to be discernible or usable. To expand the application of the method and apparatus for use with a different charging technology or with different types of the battery 12, additional testing will be required to determine the parameters and if the method and apparatus for using a battery terminal temperature differential 10 is effective.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A battery charger for use during an attempt to charge or restore a lead acid type of battery, comprising:
   a first input to receive an indication as to a temperature of a positive terminal from a first temperature probe;
   a second input to receive an indication as to a temperature of a negative terminal from a second temperature probe; and
   a monitor to take an action when a temperature differential that represents a difference in temperature between a temperature of the positive terminal and a temperature of the negative terminal at a single point in time exceeds a predetermined differential magnitude.

2. The battery charger of claim 1 wherein the predetermined differential magnitude is greater than five degrees Celsius.

3. The battery charger of claim 1 wherein the monitor comprises a visual indication or an audio indication, or both.

4. The battery charger of claim 1 wherein the monitor terminates an attempt to charge or restore the lead acid type of battery based on the temperature differential.

5. The battery charger of claim 1 wherein the first or the second temperature probe includes a temperature sensor selected from the group consisting of a thermistor, negative temperature coefficient thermistor, thermocouple, and resistive thermal device.

6. The battery charger of claim 1 wherein the first temperature probe is attached to a first clamp, and wherein the first clamp is detachably-attachable with respect to the positive terminal.

7. The battery charger of claim 1 wherein an output of the first temperature probe is provided to the battery charger by an electrical conductor that is in electrical communication with the battery charger.

8. The battery charger of claim 1 wherein an output of the first temperature probe is provided to a wireless transmitter, and wherein an output of the wireless transmitter is provided to the battery charger, and wherein the battery charger and the wireless transmitter are in communication.

9. The battery charger of claim 1 wherein the first clamp includes wireless transmitter.

10. The battery charger of claim 1 wherein the second temperature probe is attached to a second clamp, and wherein the second clamp is detachably-attachable with respect to the negative terminal.

11. The battery charger of claim 1 wherein an output of the second temperature probe is provide to the battery charger by a second electrical conductor that is in electrical communication with the battery charger.

12. The battery charger of claim 1 wherein an output of the second temperature probe is provided to a second wireless transmitter, and wherein an output of the second wireless transmitter is provided to the battery charger, and wherein the battery charger and the second wireless transmitter are in communication.

13. The battery charger of claim 12 wherein the second clamp includes the second wireless transmitter.

14. The battery charger of claim 1 wherein an output of the first temperature probe is provided to a separate unit, and wherein the separate unit is disposed proximate to the battery, and wherein an output of the second temperature probe is provided to the separate unit, and wherein the separate unit includes an internal wireless transmitter, and wherein an output of the internal wireless transmitter is provided to the battery charger, and wherein the battery charger and the internal wireless transmitter are in communication.

15. The battery charger of claim 1 wherein an output of the first temperature probe is provided to a separate unit, and wherein the separate unit is disposed proximate to the battery, and wherein an output of the second temperature probe is provided to the separate unit, and wherein the separate unit includes means for determining when the temperature differential between the temperature of the positive terminal and the temperature of the negative terminal exceeds the predetermined differential magnitude, and wherein subsequent to the temperature differential exceeding the predetermined differential magnitude, the separate unit includes means for responding by providing a separate unit output, and wherein the separate unit output includes an indication that the main temperature differential exceeded the predetermined differential magnitude, or wherein the separate unit output affects the attempt to charge or restore the lead acid type of battery by a termination thereof.

16. A method for using a temperature differential that occurs between a positive terminal and a negative terminal of a battery during an attempt to charge or restore a lead acid type of battery, comprising:
    receiving an indication as to a temperature of a positive terminal from a first temperature probe;
    receiving an indication as to a temperature of a negative terminal from a second temperature probe; and
    monitoring to take an action when a temperature differential that represents a difference in temperature between a temperature of the positive terminal and a temperature of the negative terminal at a single point in time exceeds a predetermined differential magnitude.

17. The method of claim 16 wherein the step of terminating the attempt to charge or restore the lead acid type of battery when the temperature differential between the temperature of the positive terminal and the temperature of the negative terminal exceeds said predetermined differential magnitude includes the step of terminating the attempt to charge or restore the lead acid type of battery when the predetermined differential magnitude exceeds five degrees Celsius.

18. The battery charger of claim 1 wherein the monitor determines whether restoration of the battery is possible, based on the temperature differential.

19. The battery charger of claim 1 wherein the monitor automatically initiates a desulfation process to restore the battery.

20. The battery charger of claim 1 wherein the temperature differential results from at least one of: the positive terminal temperature being greater than the negative terminal temperature, and the negative terminal temperature being greater than the positive terminal temperature.

* * * * *